June 5, 1973 A. G. TORR ET AL 3,737,321

SCREENS USED IN PHOTOMECHANICAL REPRODUCTION

Filed Sept. 17, 1971

5 Sheets-Sheet 1

June 5, 1973 A. G. TORR ET AL 3,737,321

SCREENS USED IN PHOTOMECHANICAL REPRODUCTION

Filed Sept. 17, 1971

5 Sheets-Sheet 3

SCREENS USED IN PHOTOMECHANICAL REPRODUCTION

Filed Sept. 17, 1971 5 Sheets-Sheet 5

United States Patent Office 3,737,321

Patented June 5, 1973

3,737,321

SCREENS USED IN PHOTOMECHANICAL REPRODUCTION

Alfred George Torr, The Old Parsonage, Silverstone, Northamptonshire, England, and Kevin William Canton Webb, Whetstone, England; said Webb assignor to said Torr Filed Sept. 17, 1971, Ser. No. 181,468
Claims priority, application Great Britain, Oct. 15, 1970, 49,115/70; July 7, 1971, 31,913/71
Int. Cl. G03f *5/00*
U.S. Cl. 96—116 6 Claims

ABSTRACT OF THE DISCLOSURE

A screen for photomechanical reproduction comprises a transparent sheet incorporating a refractive surface of smooth regular wave-form undulations without discontinuities formed with a pattern of cellular areas by intersecting sets of parallel ridges defining between them a plurality of hollows and providing a lenticular effect upon transmitted light. The cellular areas may be of rectilinear-sided geometric shape e.g. hexagonal. The screen may be prepared by a procedure including a photochemical or a mechanical process.

This invention relates to screens used in letter-press, photolithio and photogravure half-tone processes of reproduction. In these processes, continuous tone gradations of the original are replaced by gradations arising from the sizes and concentration or dispersal of a multiplicity of small elements into which the original subject is converted, and for this conversion a screen is used during a photographic reproduction of the original.

Screens heretofore used for these purposes have been flat surfaced, with a pattern of cellular character, in one or other of two forms. In the first type which may be referred to as a glass crossline screen, the cellular areas are transparent with an opaque surround, and the screen usually consists of two pieces of glass, ruled, etched, filled with an opaque filling and cemented togethed with their respective lines crossing at 90°. This type is used in Process Cameras in which the screen can be accurately set at a predetermined distance in front of the photosensitive plate or film, this distance depending on the number of lines per inch of the rulings and other factors.

In the second form, which may be referred to as a variable density contact screen, adjacent cellular areas are vignetted from a dark central spot to a light central spot, the basic design being that of a chess board pattern. Such a screen can be used either in a process camera or an enlarger and is usually in physical contact with the photosensitive plate or film. Hence it is called a "Contact" screen.

In view of the opaque or partially opaque patterns thereon screens of the aforesaid kinds now in use eliminate a substantial proportion of light transmitted therethrough from a picture or other object which is the subject to be reproduced. These known screens also have other undesirable limitations. Thus the crossline screen is unable to reproduce the tones and detail of an original accurately because the angles employed being 90°, the cellular areas are equidistant in only two directions, the distance in the diagonal direction being equal to the adjacent distance multiplied by the square root of 2. This prevents a cone of light from a lens passing through each screen aperture from forming an infinitesimal point as would be the case if the screen aperture were circular. Also only about 25% of the original is visible at the image plane.

In the second type, the contact screen, the reproduction of detail is improved but the absorption and scattering of light with a grey contact screen is an introduced disadvantage, while with a magneta dye contact screen, difficulty occurs when coloured filters are being used. Light absorption, and to a lesser extent scatter, are further drawbacks.

The main object of the present invention is to provide a screen which will transmit a greater proportion of light directed to it, and will reduce or overcome the aforesaid limitations of known screens.

With this end in view the invention consists in a screen for photomechanical reproduction comprising a transparent sheet having an outer surface, or an interface between materials of different refractive indices, which is irregular, or in relief, to provide a lenticular effect upon transmitted light.

The invention further consists in a method of making a screen as specified in the next preceding paragraph, wherein a substantially plane surface of a base sheet is formed into a relief surface by photographic or mechanical means.

The invention will be clearly understood from the following description of forms (given, however, merely by way of example) which it may assume, and this description will be more readily followed by reference to the accompanying drawings wherein FIGS. 1, 2 and 3 represent forms of a preferred cellular pattern used in producing a screen in accordance with the invention:

In carrying the invention into effect it is preferred that the cellular areas of the screen shall be of substantially hexagonal shape and disposition, and the following description of one form of screen according to the invention, produced by a photo-chemical process, relates to a screen with cells of that form. It should, however, be understood that the invention is applicable to screens in which the cellular areas are of other shapes and disposition, and is not limited solely to screens with hexagonal cell characteristics, but may have cells of substantially any convenient shape or array.

The production of one form of screen in accordance with the invention by photo-chemical means is illustrated in FIGS. 1–6 of the aforesaid drawings and involves the steps of producing a flat screen carrying the desired cellular pattern in opaque and transparent areas, exposing a photosensitive surface to an image of said pattern, and subsequently treating the exposed surface chemically to form a solid surface in relief in accordance with the pattern to which it has been exposed. The sheet of material having this relief surface may itself form the desired screen, or may be employed as a die in which can be moulded a transparent material, e.g. a plastics material, having a relief surface corresponding to the relief surface of the mould.

Referring to FIGS. 1–6 of the aforesaid drawings a flat screen may comprise a plate or film 1 having its surface divided into hexagonal cells 2 by a hexagonal network 3. The cells may be opaque and the network transparent, or vice versa. It will be noted that on account of the hexagonal array the centre O of any one cell is equidistant from the centre *a, b, c, d, e* and *f* of all adjacent cells.

Figure 1:
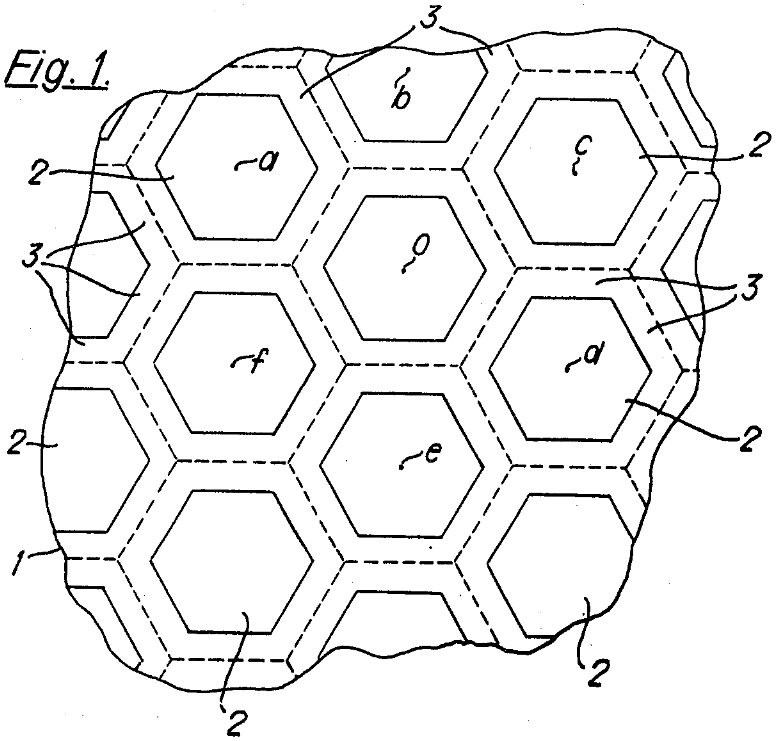
Figure 5:
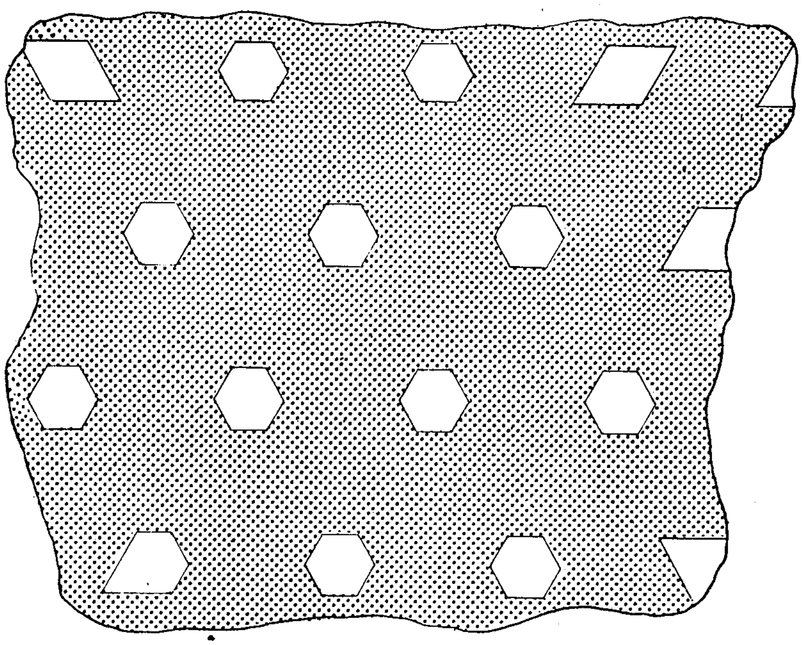
FIGS. 5 and 6 represent successive stages in the production of a patterned component for use in making a screen in accordance with the invention.
Figure 6:
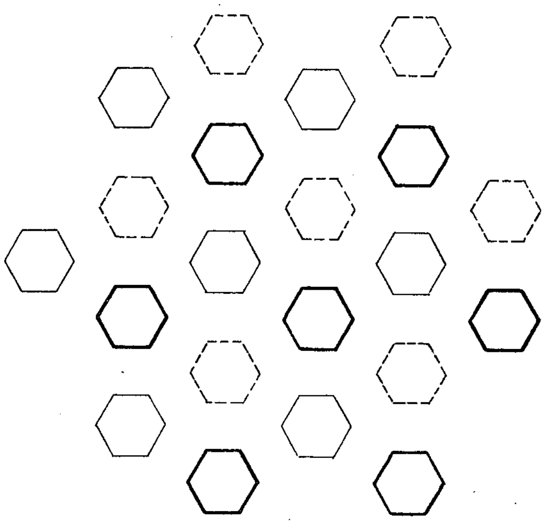

A preferred method of producing a screen such as illustrated in FIG. 1 is as follows:

A sheet of glass, coated with an opaque acid resist is ruled by machine with two sets of spaced parallel lines, of selected width, inclined by 60°. These clear lines bound rhomboids of unremoved coating. The sheet is ruled by a third set of lines inclined at 60° to the two sets previously mentioned, and so located and dimensioned as to remove the acute tips of each rhomboid, leaving hexagonal areas of unremoved coating. After etching the sheet along the ruled lines the remaining acid resist (i.e. in the hexagonal cells) is removed, the etched recesses being filled with an opaque material, to provide on the sheet an array of transparent hexagons with opaque surrounds, as shown in FIG. 5 (where the "line" areas shown stippled are to be regarded as opaque). The honeycomb pattern shown in FIG. 1 is then produced photographically, using this master, by treble contact printing on a sensitive plate, each of the three exposures being made with the master in a position displaced from that of a previous exposure. Thus a first exposure provides hexagonal cells located as shown in full thick line in FIG. 6, a second exposure provides other hexagonal cells located as shown in dotted line in FIG. 6, and a third exposure provides another set of hexagonal cells as shown in thin line in FIG. 6. When the plate is developed after these treble exposures, it displays hexagons arrayed as shown in FIG. 1. It will be noted that it incorporates in any given area three times the number of hexagonal cells as shown in FIG. 5. If required clear hexagons with an opaque network surround can be obtained photographically from this treble-exposed plate of FIG. 6, after development, by another stage of contact printing.

If desired a "vignetted" screen may be produced by a further operation. For this purpose either of the above-described opaque and transparent screens with hexagonal cells is placed out of contact with a photosensitive plate and an exposure made. Upon development a vignetted hexagonal screen is produced. Instead of using normal developers which produce silver (grey) images, "dye coupling" may be used to produce coloured images.

Figure 2:
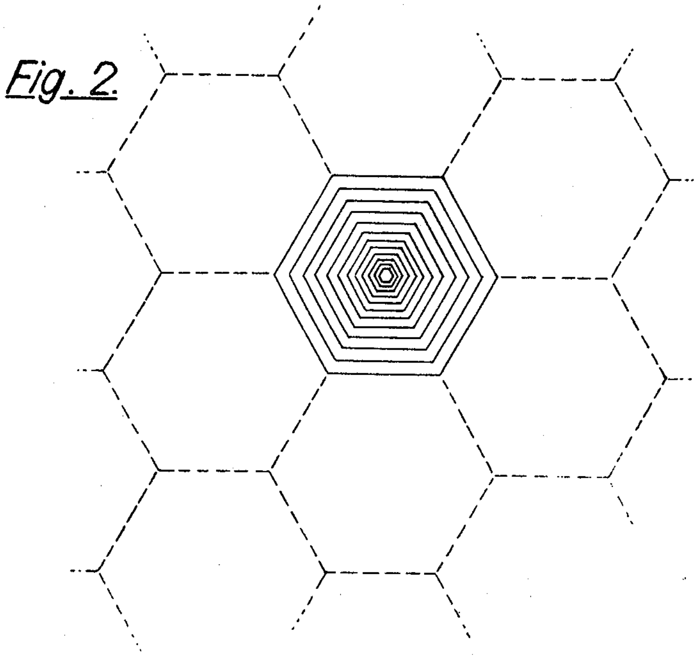
Figure 3:
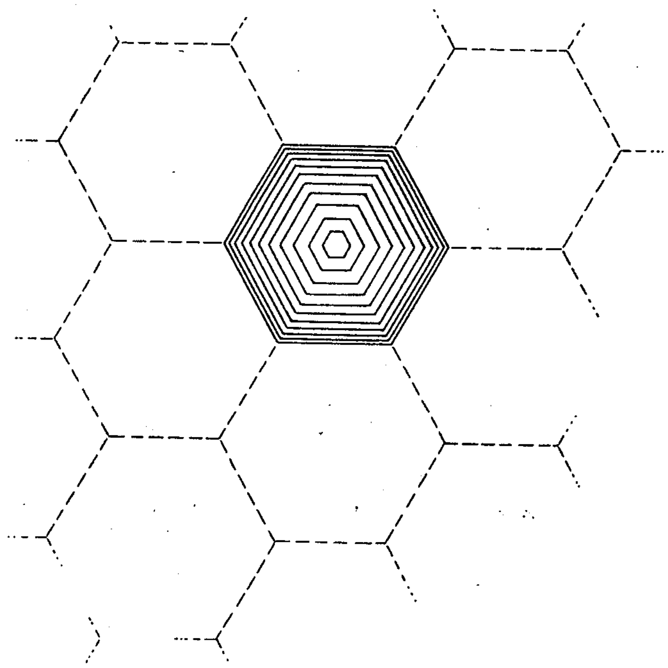

Alternatively a diagram e.g. a drawing, may be made having large "vignetted" hexagons disposed hexagonally, and this unit optically reduce and photographically repeated using a step-and repeat machine. In these ways screens such as shown in FIG. 2 or FIG. 3 may be produced.

However prepared, a flat opaque-transparent screen, as described above is used to produce a relief surface, by photo-chemical means. There are several processes known for producing a relief image in gelatine which may be employed for this purpose. For example, (a) A sheet of film base is coated with soft bichromated gelatine and exposed to light passed through the opaque-transparent screen, of which an image is thus projected onto the exposed surface. Upon immersion in warm water, the soft gelatine that has not been exposed to light dissolves leaving a relief image of gelatine insolubilised by the action of light.

(b) Another method is to use what is known as the Etch/Bleach process. A photographic film is exposed to an image of the opaque-transparent screen, developed, fixed and washed in known manner. The film is then immersed in a copper sulphate/hydrogen peroxide etch bath which removes all silver and associated gelatine, leaving a gelatine relief image.

If a hexagon screen such as shown in FIG. 1 is placed a short distance in front of a sensitized film (following either method (a) or (b)) and the film exposed and processed according to the requirements of the method used, a variable relief screen of hexagonal disposition is produced. These methods may also be used to produce any form of variable relief screen other than hexagonal.

In the aforesaid procedures, any light sensitive material which will form a relief image may be employed instead of gelatine as a coating or as a complete screen, for instance as in the case of photopolymer. By using different spacings between the master pattern and the sensitised surface at the time of exposure, steep or shallow curvatures of the recessed areas ultimately formed in the relief surface may be obtained.

As previously stated the backing on which is formed a relief surface by the aforesaid photo-chemical treatment may be used as the final screen, or a mould is made from from this relief from which further copies are produced.

The screen may be made of any material that is of itself transparent. It can be of one piece with one face, or surface, shaped or moulded to produce the desired profile; or it may be mounted on a transparent base such as glass or plastic film. Again it may be produced in either of the above forms and then sealed with a transparent film or coating on the relief surface to provide a perfectly smooth surface, thereby protecting the relief surface from damage and dirt. If this coating is either of a slightly different thickness to the base and/or having a different refractive index, it will provide an optical interface to alter the relative position of the focal point of the profile of the elements, when the screen is used the reverse way round, i.e. coating side to sensitive emulsion. This then provides a contact screen having two different tonal ranges, one for each side of the screen making it more versatile than any known contact screen.

As a alternative to the above described photo-chemical process for producing a screen in accordance with the invention, a mechanical process may be employed, as will now be described with reference to FIGS. 7–9 of the aforesaid drawings.

In this mechanical process a plunger 4, tipped with a diamond, sapphire, silicon carbide, boron carbide, hardened steel or similar hard material (FIG. 9), the tip carefully machined to the size and shaped required, is "plunged" (i.e. impelled hammer-wire) into a surface of soft metallic alloy or any other soft non-elastic material which will retain a perfect impression of the plunger tip. This soft surface material is mounted on the bed of a machine working on the system of a ruling machine, the principle of which is already known.

The machine bed on which is secured the sheet of soft metal alloy or other material is kept stationary during the time of each reciprocation of the plunger.

The plunger 4 is vertically reciprocable in a carrier support 5 which is slidable in a slot in a bridge 6 extending across a base 7 with channels 8, 9 therein. A bed 10 is formed with under slide members 11, 12 which ride in the channels 8 and 9 respectively.

Figure 7:
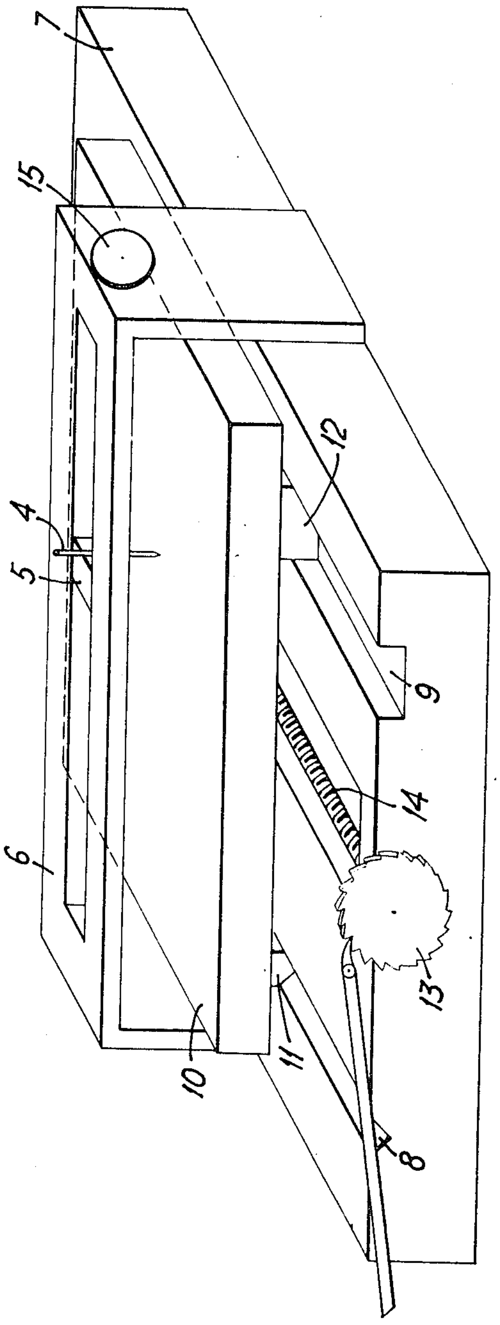
FIG. 7 represents in perspective and somewhat diagrammatically, a device in accordance with the invention for use in production, employing mechanical operations, to produce a screen such as shown in FIG. 4.
Figure 8:
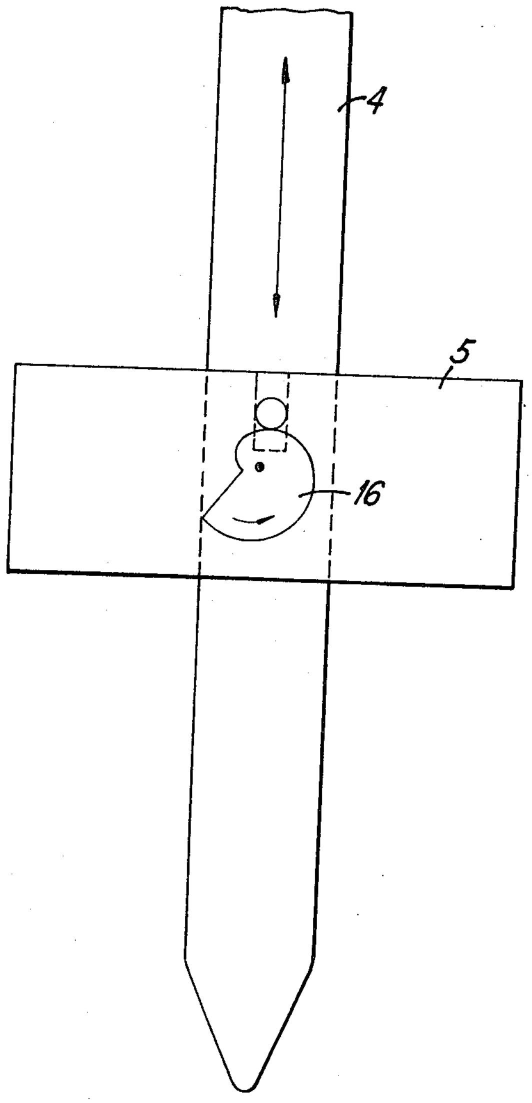
FIGS. 8 and 9 represent enlarged side elevational views of the plunger or indenting component shown in FIG. 7.

A ratchet wheel is fixed to the end of the screw 14 moves the bed 10 parallel to the screw intermittently by a distance depending on the number of dots per inch required, and when it becomes stationary the plunger descends indenting the surface (FIG. 7). The selection and/or adjustment of the number of ratchet teeth moved determines the necessary movement. The machine continues until one line of indentations have been completed whereafter by means of the aforementioned screw 14 the bed 10 is returned to its original position.

The plunger carrier 5 is movable by a second screw 15 mounted at right angles to the first mentioned screw 14 on a traverse above the machine bed 10, and is moved sufficiently to locate the indentations correctly for a second line. This process is continued until the whole of the required area is indented.

The plunger may be controlled by a rotatable cam 16 (FIG. 8) working in conjunction with the movement of ratchet wheel whereby the cam is so adjusted that it allows the plunger to fall during each stationary period. The cam lifts the plunger clear of the soft surface before the screw 14 is again turned. The depth of the indentation is achieved by the weight of the plunger, which can be increased as required by adding small lead weights to the upper end of the shaft.

The required depth of indentation of the plunger into the metal alloy is such that the edges of the indentations in the material just abut on one another when the correct movement of the plunger is achieved.

Figure 9:
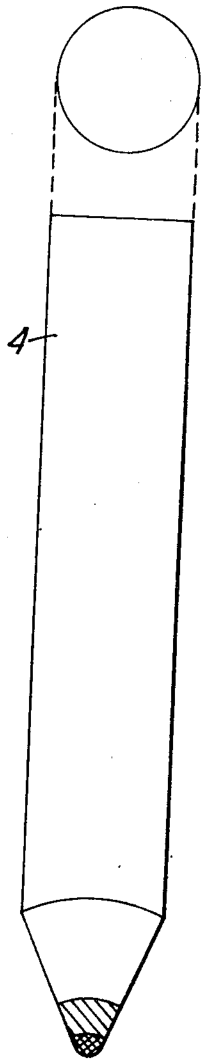

The tip of the plunger is preferably so shaped that it will form a dome, the curve of which varies from top centre to the outer extremities (FIG. 9). The central curve of the plunger tip has as its principal focus the distance corresponding to thickness of the final screen. The outer curves have progressively longer focal lengths. This provides a final moulded contact screen which produces a photographic negative consisting of dots which commence as tiny dots behind the centre of each element of the screen profile and gradually increase in size with contained exposure of the negative to light.

The soft surface plate indented by the plunger is used as a master for duplication by moulding. Using a transparent plastic, dyed or colourless, a transparent contact screen is made by moulding from this master. For screens required in large quantities the original master in alloy may be copied electrolytically giving a hard metal master from which a large number of mouldings (contact screens) are obtained without deformation of the precisely-formed cavities of the alloy plate master.

A direct moulding from the original master gives a negative working screen, and a mould from an electrotyped copy of the original master, a positive working screen.

Any of the screens described above may have transparent elements of any desired shape in relief. The profile of each element shaped in such a manner as to refract the incident light, and after refraction the light is brought to a predetermined focus or foci. The individual elements may be of any symmetrical pattern such as triangles, rhomboids, circles, rectangles etc. or any irregular shape, e.g. chalk grain, linen weave, mottle, continuous line etc. The disposition of the individual elements may also be either in a regular or irregular pattern which will produce an image for any printing process. The screen may also be tinted; or tinted in predetermined areas with a dye, or any other substance which will to a certain extent retard the passage of light.

This preferred hexagonal formation described provides a unit area with the greatest number of dots possible, which thereby improves the definition. There will be no overlapping of dots—which is the cause of tone compression in highlights on negatives made with known screens, and no abrupt jump in tone value which adjacent dots meet.

Figure 4:
FIG. 4 represents in side sectional elevation a relief or lenticular screen in accordance with the invention, the section being in the plane through the centres *f*, *o*, *c* of cells shown in FIG. 1.

Each lenticular area or hexagon will have a profile as in FIG. 4. This profile—produced by the curvatures—of the relief image can be plotted to produce a dot formation covering almost any desired tonal range with tones compressed or extended in any part of that range.

As the screen has no opaque or dyed areas, practically the whole of the light that falls on it will pass through on to the light sensitive emulsion thereby providing the shortest possible exposure and at the same time allowing all of the original copy for reproduction to be "seen."

From the above description it will be seen that the invention provides forms of screens for preparing printing surfaces which facilitate accurate copy of original subjects, but it should be understood that the invention is not limited solely to details of the forms described above, which may be modified, in order to meet various conditions and requirements encountered, without departing from the scope of the invention.

What we claim is:

1. A screen for photomechanical reproduction comprising a transparent sheet incorporating a refracting surface which is of smooth regular wave-forth undulations, without discontinuities, providing a lenticular effect upon transmitted light, said refracting surface comprising intersecting sets of parallel ridges defining between them a plurality of hollows.

2. A screen according to claim 1 wherein the said refracting surface comprises intersecting sets of ridges defining between them cellular recessed areas of substantially rectilinear-sided geometric shape.

3. A screen according to claim 1 wherein the said refracting surface comprises intersecting sets of ridges defining between them cellular recessed areas of substantially hexagonal shape.

4. A screen according to claim 1 wherein the said refracting surface comprises intersecting sets of parallel grooves defining between them a plurality of upstanding hillocks.

5. A screen according to claim 1 wherein the said refracting surface comprises intersecting sets of parallel grooves defining between them a plurality of hillocks of substantially rectilinear-sided geometric shape.

6. A screen according to claim 1 wherein the said refracting surface comprises intersecting sets of parallel grooves defining between them a plurality of hillocks of substantially hexagonal shape.

References Cited

UNITED STATES PATENTS

| | | | |
|---|---|---|---|
| 1,722,368 | 7/1929 | Comstock | 96—116 |
| 2,304,988 | 12/1942 | Yule | 96—116 |
| 2,316,644 | 4/1943 | Yule | 96—116 |
| 2,311,071 | 2/1943 | Murray | 96—116 |
| 3,249,437 | 5/1966 | Eekhout | 96—116 |

FOREIGN PATENTS

| | | | |
|---|---|---|---|
| 530,184 | 9/1956 | Canada | 96—116 |

NORMAN G. TORCHIN, Primary Examiner

R. L. SCHILLING, Assistant Examiner

U.S. Cl. X.R.

96—38.3, 35, 81; 117—8.5